(12) United States Patent
Yamauchi et al.

(10) Patent No.: US 8,893,162 B2
(45) Date of Patent: Nov. 18, 2014

(54) OPTICAL DISC DRIVE

(75) Inventors: Yoshiaki Yamauchi, Omitama (JP);
Tatsuya Yamasaki, Hitachinaka (JP);
Nozomu Harada, Kawasaki (JP); Sojiro Kirihara, Kawasaki (JP); Ikuo Nishida, Ebina (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 955 days.

(21) Appl. No.: 13/022,836

(22) Filed: Feb. 8, 2011

(65) Prior Publication Data

US 2011/0197211 A1    Aug. 11, 2011

(30) Foreign Application Priority Data

Feb. 8, 2010   (JP) .................................. 2010-025388

(51) Int. Cl.
*G11B 7/0037*   (2006.01)
*G11B 7/085*    (2006.01)

(52) U.S. Cl.
CPC ................................ *G11B 7/08582* (2013.01)
USPC ....................................................... 720/665

(58) Field of Classification Search
USPC ................................................. 720/665, 664
See application file for complete search history.

(56) References Cited

U.S. PATENT DOCUMENTS

2004/0205795 A1   10/2004   Choi

FOREIGN PATENT DOCUMENTS

| CN | 1501400 | | 6/2004 | |
|---|---|---|---|---|
| JP | 9-14375 A | * | 1/1997 | |
| JP | 09063213 A | * | 3/1997 | ............ G11B 21/02 |
| JP | 2002-304860 A | * | 10/2002 | |
| JP | 2003-288763 | | 10/2003 | |
| JP | 2003-288763 A | * | 10/2003 | |

OTHER PUBLICATIONS

Chinese Office Action for Application No. 201110036107.8, for corresponding US Application dated May 2, 2013.

* cited by examiner

*Primary Examiner* — Julie Anne Watko
(74) *Attorney, Agent, or Firm* — Antonelli, Terry, Stout & Kraus, LLP.

(57) ABSTRACT

In an optical disc drive, a degradation of traveling performance of an optical pickup under hard acceleration or hard deceleration in a random access operation or the like results in a degradation of recording/reproducing performance. Groove structure is provided between two gears of a guide feed provided in an optical pickup, and the groove forms bending structure. Thus, the engagement state between a screw gear and the gears of the guide feed is stabilized. This makes it possible to prevent tooth jumping and step-out from occurring in the gears during the traveling of the optical pickup, achieving stable traveling. In consequence, the recoding/reproducing performance of the optical disc drive can be improved.

15 Claims, 6 Drawing Sheets

FIG. 1

RELATED ART

FIG. 2

RELATED ART

FIG. 3

RELATED ART

FIG. 4A

RELATED ART

OPTICAL DISC DRIVE

BACKGROUND OF THE INVENTION (i) Field of the Invention

This invention relates to traveling performance of an optical pickup in an access operation and, more particularly, to an optical disc drive capable of preventing tooth jumping and step-out from occurring in a gear feed mechanism of an optical pickup to improve the recording/reproducing performance.

(ii) Described of the Related Art

Stable recording/reproducing in optical disc drives requires improved traveling performance of an optical pickup moving in the radial direction of a disc.

In an optical pickup driving system of a slim-type optical disc drive, a screw gear mounted integrally with a rotation shaft of a stepper motor is meshed with a guide feed gear provided on a housing of the optical pickup. With the rotation of the stepper motor, the driving force is transmitted to the optical pickup, so that the optical pickup travels in the radial direction of a disc.

At this stage, the guide feed gear is pressed against the screw gear by a constant pressing force. If hard acceleration of traveling is applied, the guide feed gear runs on to the screw gear, causing a phenomenon of tooth jumping, step-out or the like between the gears. Accordingly, a proper pressing force of the guide feed gear against the screw gear in accordance with an access condition is required for an improvement in the traveling performance of the optical pickup.

In the related art, there is structure of using a leaf spring, a spring or the like to press a gear provided on a guide feed against a screw gear.

JP-A No. 2003-288763 discloses the structure in which two gears provided on a guide feed is formed of a leaf spring and pressed against a screw gear.

The art described in JP-A No. 2003-288763 is the structure of pressing two protrusions (gears) provided on an optical pickup against a groove of a screw gear in separated positions. However, since a sheet-shaped leaf spring giving a pressing force to the protrusions is fixed in asymmetric positions of the two protrusions, different pressing forces are applied to the screw gear.

On the other hand, since the optical pickup moves (travels) in a range from the inner periphery to the outer periphery of a disc, the screw gear and the gears provided on the optical pickup differ in press characteristics from each other.

The press characteristics of the optical pickup are desirably exhibited equally in the range from the inner periphery to the outer periphery of a disc at all times. For this purpose, symmetric structure is required for the structure of pressing the two gears provided on the optical pickup against the screw gear.

SUMMARY OF THE INVENTION

The present invention has been made in view of the above circumstances and provides an optical disc drive capable of pressing two gears provided on an optical pickup against a screw gear by an equal pressing force in order to ensure stable traveling characteristics at all times irrespective of a traveling direction, and of controlling posture of the two gears provided on the optical pickup in order to reduce a failure such as tooth jumping, step-out or the like to offer stabilized recording/reproducing performance.

To provide such an optical disc drive, accordingly, a disc drive comprises a spindle motor for rotating an optical disc, an optical pickup for writing/reading an optical disc rotating, a guide feed mounted to the optical pickup, two symmetric gears attached to the guide feed, and a screw gear having a helical groove engaged with the two symmetric gears for traveling of the optical pickup. In the optical disc drive, the guide feed has elasticity producing deformation in a direction of pressing the two symmetric gears against the groove of the screw gear.

Preferably, the guide feed may elastically deform in a direction that the two symmetric gears holds the groove of the screw gear.

Preferably, the guide feed may elastically deform in a direction that the two symmetric gears opens up the groove of the screw gear.

Preferably, the guide feed may include a portion between the two symmetric gears which is given initial bending elasticity, and is pressed against a lead screw in order for an inward bending force to act on the two symmetric gears, so that the two symmetric gears allow an approximately equal pressing force to act on the screw gear.

Preferably, the guide feed may include a portion between the two symmetric gears which is given initial bending elasticity, and is pressed against a lead screw in order for an outward bending force to act on the two symmetric gears, so that the two symmetric gears allow an approximately equal pressing force to act on the screw gear.

Preferably, the guide feed may have a groove formed between the two symmetric gears.

According to the present invention, even when an optical pickup hardly accelerates/decelerates in a radial direction of a disc in a random access operation in the recording/reproducing process, a failure such as tooth jumping, step-out or the like occurring in travel-system gears can be eliminated, thus achieving stable traveling. This makes it possible to provide an optical disc drive increased in reliability of recording/reproducing performance and the like.

BRIEF DESCRIPTION OF THE DRAWINGS

Embodiments of the present invention will be described in detail based on the following drawings, wherein.

DETAILED DESCRIPTION OF THE INVENTION

An optical disc drive 1 according to embodiments of the present invention will be described below with reference to the accompanying drawings. FIG. 1 to FIGS. 6A, 6B are diagrams showing and illustrating embodiments, in which parts designated by the same reference numeral represent the same component and are essentially identical in structure and operation.

First Embodiment

First, the structure of the optical disc drive 1 according to a first embodiment of the present invention is described.

Figure 1:
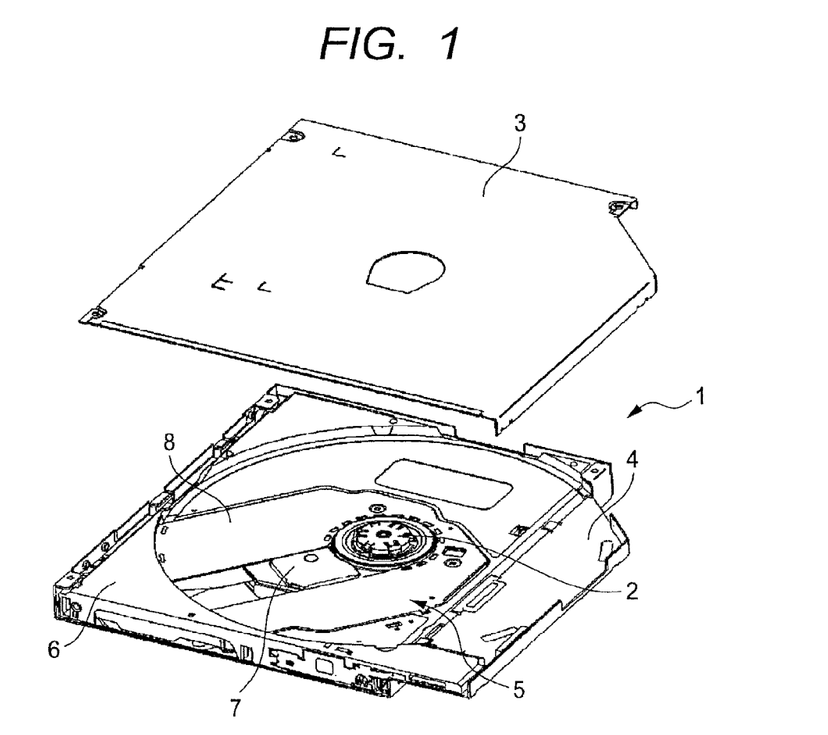
FIG. 1 is an exploded perspective view illustrating the structure of a general optical disc drive.

FIG. 1 is a perspective exploded view of the optical disc drive in the first embodiment.

In FIG. 1, the optical disc drive 1 is operated for recording/reproducing information onto/from the recording surface of a recording medium such as CD, DVD, BD (Blu-ray Disc) or the like having a diameter of 120 mm and a thickness of 1.2 mm (hereinafter referred to simply as "disc").

The optical disc drive 1 discussed in the embodiment according to the present invention is one of called slim-type (or super-slim-type) drives formed roughly in a low-profile box shape with a width of 130 mm, a length of 130 mm and a mounting height of 12.7 mm (or 9.5 mm) and mounted in a mobile personal computer.

The optical disc drive 1 includes a housing into which a top caver 3 and a bottom cover 4 are assembled by fitting and screw-fastening. The top cover 3 and the bottom cover 4 are each formed of a thin steel plate by press-forming. A resin-molding disc tray 6 is placed within the housing (in the optical disc drive 1). A front panel (not shown) is attached to the front end of the disc tray 6 and the disc is loaded/unloaded through the front panel. A unit mechanism 5 is mounted on the bottom surface of the disc tray 6. The unit mechanism 5 is attached to the disc tray 6 through a plurality of insulators formed of elastic members. The insulators provide damping of shocks and vibrations transmitted from the outside of the driver to the unit mechanism 5, or shocks and vibrations transmitted from the unit mechanism 5 to the outside.

The unit mechanism 5 has a unit mechanism chassis (not shown) as a base. On the unit mechanism chassis are mounted a spindle motor 2 driven to rotate a disc, an optical pickup 7 reproducing information from the recording surface of the disc or recoding information on the recording surface, a driving unit for moving the optical pickup 7 along the radial direction of the disc, and a unit cover 8 preventing contact with the above components and blocking electrical noise.

A circular recess with a diameter slightly larger than the outer diameter of the disc is formed in a central portion of the disc tray 6. A cutout hole is formed in a portion of the bottom surface of the circular recess, so that the unit cover 8 of the unit mechanism 5, the optical pickup 7 and the spindle motor 2 are exposed. For loading/unloading the disc, a guide mechanism provided on both sides of the disc tray 6 is operated to slide and eject the disc tray 6 from the front panel to the outside of the optical disc drive 1.

In the optical disc drive 1 according to the embodiment of the present invention, an improvement is achieved in the stabilization of the travel system of the optical pickup 7 suddenly accelerating/decelerating because of, for example, a random access operation or the like while the optical pickup 7 travels in the radial direction of the disc for recording/reproducing information to/from the disc. Specifically, the optical disc drive 1 is improved in the structure of travel drive transmission to the optical pickup 7 for the sake of improved reliability of the optical disc drive 1.

A travel mechanism of the optical pickup 7 is described with reference to FIG. 2.

Figure 2:
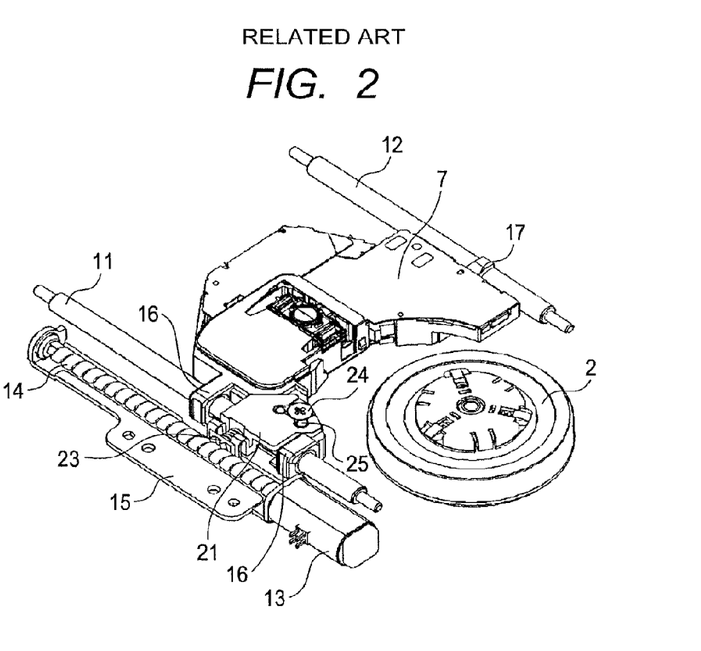
FIG. 2 is a perspective view illustrating a spindle motor, an optical pickup and optical-pickup travel structure in an optical disc drive.

FIG. 2 is a perspective view showing the spindle motor, the optical pickup and the optical-pickup traveling structure in the optical disc drive.

In FIG. 2, structural components disposed around the optical pickup are a spindle motor 2, a stepper motor 13 which is a component of generating a travel drive power, a screw gear 14 forming a part of the drive-power transmission structure, and a guide feed 21 mounted to the optical pickup 7. In the recording/reproducing operation, a disc (not shown) is loaded on the spindle motor 2, and then the optical pickup 7 travels in the radial direction of the disc. At this time, the optical pickup 7 travels by sliding along the main-shaft guide bar 11 and the sub-shaft guide bar 12 via the main-shaft bearing 16 and the sum-shaft bearing 17.

The travel drive power generated by the stepper motor 13 provided in the unit mechanism 5 is transmitted through the screw gear 14 combined with the rotation shaft of the stepper motor 13 and the guide feed 21 mounted to the optical pickup 7, so that the optical pickup 7 travels. The guide feed 21 has two teeth (gears 23) which are engaged with a groove of the screw gear 14. The groove of the screw gear 14 is shaped in a helical form. The rotation of the groove transmits the drive power through the two gears 23 the drive power is transmitted to allow the optical pickup 7 to travel. A bracket 15 supports the stepper motor 13 and the screw gear 14. The guide feed 21 is formed of a resin molding, which is attached by a screw 24 with reference to two positioning pins 25 provided in the housing of the optical pickup 7.

The structure of the guide feed 21 is will be described below in detail with reference to FIG. 3.

Figure 3:
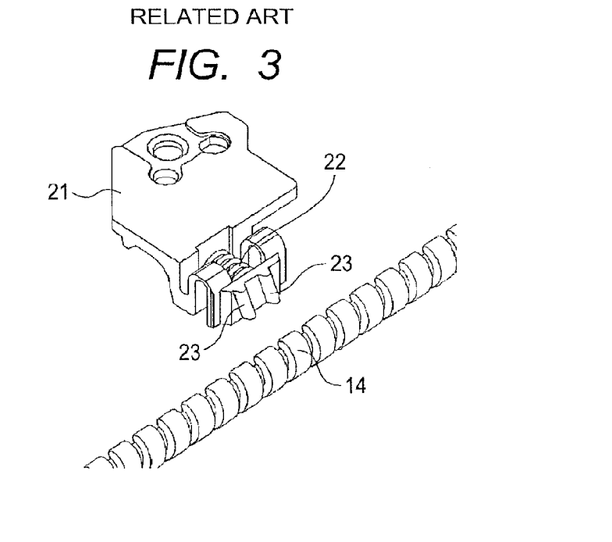
FIG. 3 is a structural diagram of a related-art guide feed and a screw gear in a travel drive transmission mechanism of an optical pickup.

FIG. 3 is a structural diagram of a related-art guide feed and a related-art screw gear in a travel drive transmission mechanism of an optical pickup.

In FIG. 3, the guide feed 21 is attached to the housing of the optical pickup 7 by a screw 24 with reference to the two positioning pins 25 as shown in FIG. 2. The guide feed 21 has two symmetric gears (teeth) 23 formed at the leading end of an S-shaped portion extending from a portion attached to the optical pickup 7. A spring 22 is contained within the S-shape construction, so that the two gears 23 are pressed against the groove of the screw gear 14 at all times.

Problems arising when the optical pickup 7 travels by such gear structure, which are addressed by the present invention, will be described next with reference to FIG. 4.

Figure 4A:
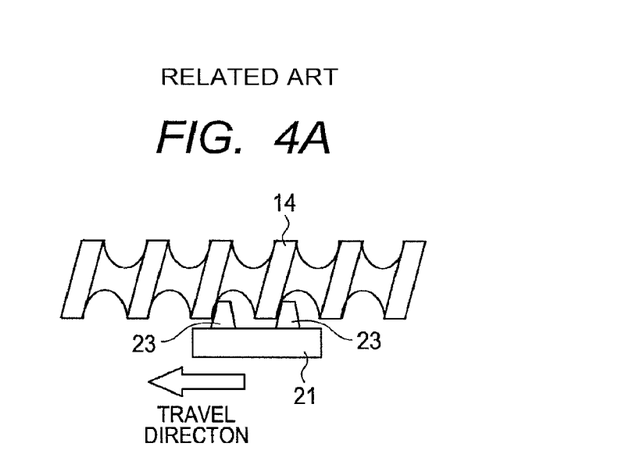
FIGS. 4A, 4B are diagrams illustrating unstable behavior of a guide feed when the optical pickup travels.
Figure 4B:
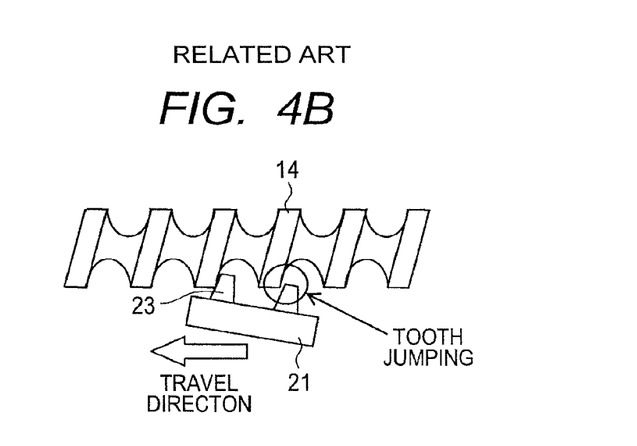

FIGS. 4A, 4B are diagrams showing a state of engagement of the screw gear 14 and the two symmetric gears 23 provided at the leading end of the guide feed 21 (only the leading end is shown in FIGS. 4A, 4B).

FIG. 4A shows a stable travel state of the optical pickup 7. In relation to the helical groove of the screw gear 14, the two gears 23 of the guide feed 21 are respectively engaged with the adjacent grooves of the screw gear 14, and each of the gears 23 is in contact with one of the side faces of the groove in the travel direction (indicated by the arrow) shown in FIG. 4A. In the optical disc derive 1, the optical pickup 7 is sharply accelerated and/or decelerated in, for example, an operation of reproducing disc information in the direction from the inner periphery of the disc toward the outer periphery such as in a sequential read. On this account, the state shown in FIG. 4 can be maintained, thus relatively stable traveling of the optical pickup.

However, for example, when information is recorded in random positions on the disc, the optical pickup make random access for reproduction. In this case, the guide feed 21 cannot stably follow the screw gear 14 as shown in FIG. 14B. In some cases, one of the two gears 23 may be disconnected (circled in FIG. 4B) from the groove.

This phenomenon is called "tooth jumping". After the tooth jumping, if a force is further applied in the travel direction, the two gears 23 may be completely disengaged from the groove, that is, a so-called step-out phenomenon occurs. It is found that these phenomena notably occur in hard acceleration/deceleration, in particular, when the optical pickup 7 starts running. From various studies to address such phenomena made by the inventors of the present invention, the following embodiment can be considered.

Figure 5A:
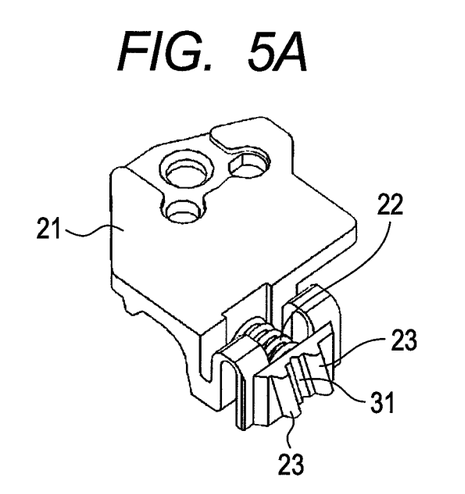
FIGS. 5A, 5B are perspective views illustrating guide-feed structure according to embodiments of the present invention.
Figure 5B:
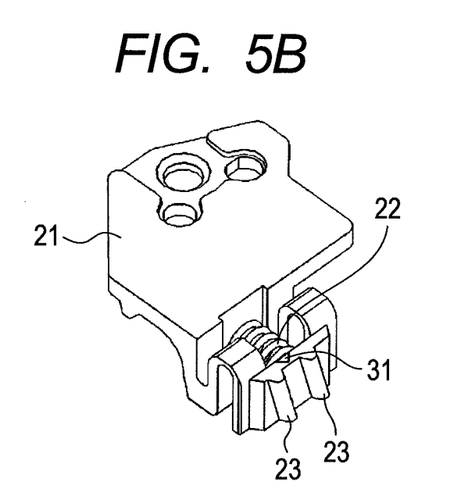

FIGS. 5A, 5B are perspective views showing the structure of a guide feed according to the embodiment.

In FIGS. 5A, 5B, a feature of the embodiment is bending elasticity produced by local multi-level structure (groove structure 31) formed between the two gears 23 provided on the guide feed 21.

The guide feed 21 shown in FIGS. 5A, 5B is fixedly attached to the optical pickup 7 with the screw 24 and the two positioning pins 25 (see FIG. 2) which are provided in the housing of the optical pickup 7 as described earlier. The guide feed 21 has two gears 23 provided at the leading end of an S-shaped sheet portion extending from the attached portion toward the screw gear 14. A spring 22 is contained within the S-shape construction, so that the two gears 23 are pressed against the groove of the screw gear 14 at all times.

In the structure of the guide feed 21 shown in FIG. 5A, the groove structure 31 is disposed in a portion of an outer face (facing the screw gear 14) between the two gears 23 provided on the leading end. In the structure shown in FIG. 5B, the groove structure 31 is disposed in a portion of an inner face (facing the housing of the optical pickup 7) and between the two gears 23 provided on the leading end.

With the structures according to the above-described embodiment, each of the two gears 23 provided on the guide feed 21 does not act as a rigid body on the screw gear 14, and acts on the groove of the screw gear 14 at a uniform pressing force.

The provision of the groove structure 31 between the gears 23 allows a reduction in distance between the gears as compared with the use of a generally-used flat-spring steel when each gear 23 is independently pressed against the groove of the screw gear 14. From this aspect, the adjacent grooves of the screw gear 14 can be used for the gears 23 to be engaged with the screw gear 14, thus achieving a reduction in size of the optical pickup 7.

Next, a description with reference to FIGS. 6A, 6B will be given of a difference in a pressing action of the guide feed 21 on the screw gear 14 between the structure of the guide feed 21 shown in FIG. 5A and the structure of the guide feed 21 shown in FIG. 5B.

Figure 6A:
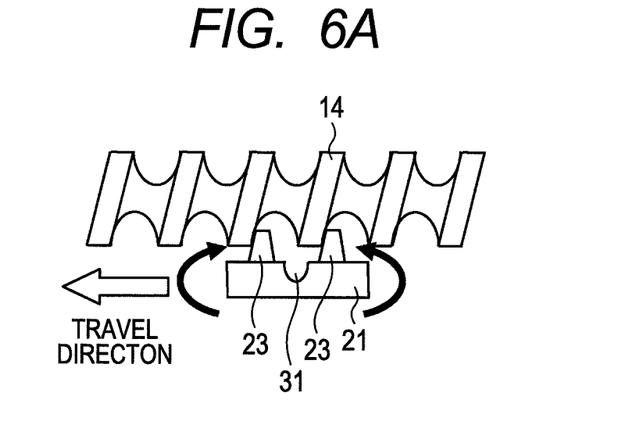
FIGS. 6A, 6B are diagrams illustrating travel behavior of a guide feed and a screw gear according to embodiments of the present invention.
Figure 6B:
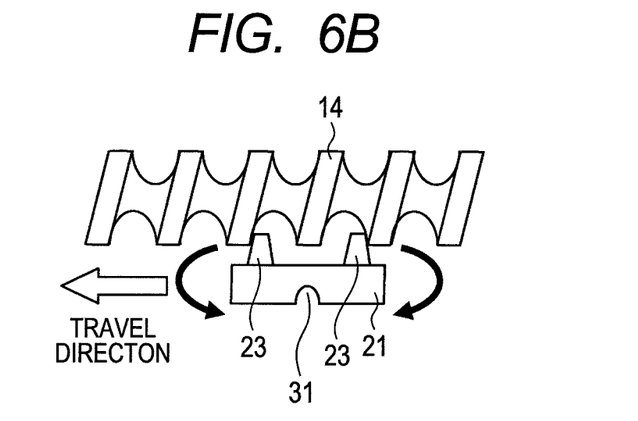

FIGS. 6A, 6B are diagrams illustrating an engagement state between the gears 23 of guide feed 21 and the groove of the screw gear 14 according to the embodiment of the present invention illustrated in FIGS. 5A, 5B.

FIG. 6A shows the engagement state of the gears 23 of the guide feed 21 in the structure shown in FIG. 5A.

In FIG. 6A, when the optical pickup 7 travels in the direction shown by the arrow, the traveling-direction side face of each of the two gears 23 of the guide feed 21 is supported in contact with the groove of the screw gear 14 at all times. At this time, because of the groove 31 provided between the two gears 23, a force in the direction shown by the arrow acts on the gears 23 at all times, so that the gears 23 are stably pressed against the groove of the screw gear 14 at all times. As a result, even in a random access operation or the like in which hard acceleration/deceleration acts on the gears while the optical pickup 7 travels, a failure such as tooth jumping, step-out or the like does not occur, resulting in stable traveling.

In other words, since the guide feed 21 has two parts on both sides of the groove 31, and the two parts respectively have spring properties acting in the directions shown by the arrows, the two gears 23 are supported inward on their traveling-direction sides at all times in contact with the groove of the screw gear 14. That is, since the two symmetric gears 23 act in such a manner as to hold the helical groove, the tooth jumping and the step-out can be prevented.

FIG. 6B shows the engagement state of the gears 23 of the guide feed 21 in the structure shown in FIG. 5B.

In FIG. 6B, when the optical pickup 7 travels in the direction shown by the arrow, the outer side of each of the two gears 23 of the guide feed 21 is supported in contact with the groove of the screw gear 14. Because of the groove structure 31 provided between the two gears 23, a force in the direction shown by the arrow acts on the gears 23 at all times. Thus, as in the case of the aforementioned groove structure of the guide feed 21, even when hard acceleration/deceleration acts on the gears while the optical pickup 7 travels, a failure such as tooth jumping, step-out or the like does not occur, resulting in stable traveling. In consequence, the present invention can provide an optical disc drive 1 with reliable recording/reproducing performance.

In other words, since the guide feed 21 has two parts on both sides of the groove 31 on the opposite side of the gears 23 from the screw gear 14, and the two parts respectively have spring properties acting in the directions shown by the arrows, the two gears 23 are supported outward on their traveling-direction sides at all times in contact with the groove of the screw gear 14. That is, since the two symmetric gears 23 acts in the direction of opening up the width of the helical groove, the tooth jumping and the step-out can be prevented.

Second Embodiment

A second embodiment according to the present invention will be described below with reference to FIGS. 7A, 7B.

Figure 7A:
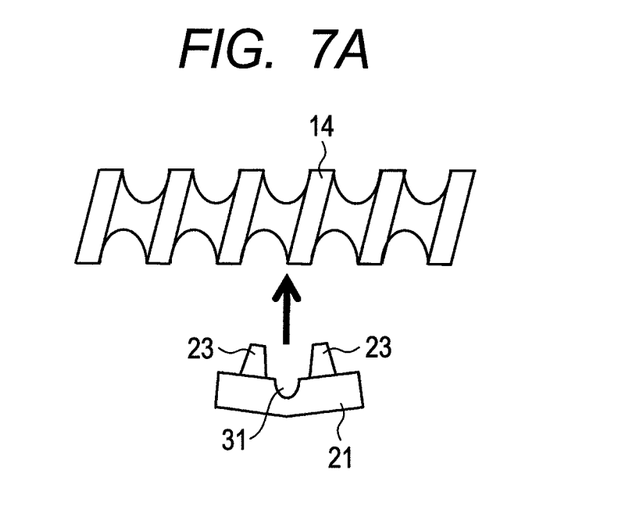
FIGS. 7A, 7B are diagrams illustrating guide feed structure according to embodiments of the present invention.
Figure 7B:
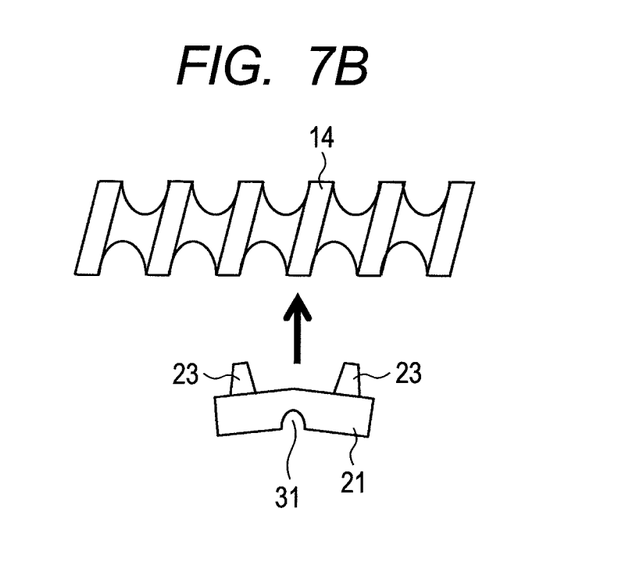

FIGS. 7A, 7B are diagrams illustrating the guide feed structure according to the second embodiment of the present invention.

In the structure illustrated in the first embodiment in FIGS. 5A, 5B, the groove structure 31 is provided between the two gears 23 provided on the guide feed 21, and additionally the groove structure 31 is structured as a bending member to produce initial bending deformation with respect to the two gears 23.

FIG. 7A illustrates an embodiment of the groove structure 31 formed between the two gears 23 provided on the guide feed 21 on the side facing the screw gear 14. In the embodiment, the bending structure is constructed such that the groove 31 is located on the inner side.

In this manner, when the guide feed 21 is pressed against the screw gear 14, the pressing force produces deformation such that the bending member is opened up, and then the reaction force causes a pressing force in the direction of the screw gear 14 to act on the two gears 23. The pressing force acts such that the two gears 23 come into contact with the groove of the screw gear 14 in the traveling direction at all times as illustrated in FIG. 6A.

In other words, since the guide feed 21 has a spring property imparted by initial bending along the groove 31 serving as a boundary, the two gears 23 are supported inward on their traveling-direction sides at all times in contact with the groove of the screw gear 14.

FIG. 7B illustrates an embodiment of the groove structure 31 formed between the two gears 23 provided on the guide feed 21 and in a face facing toward the optical pickup. In the embodiment, the bending structure is constructed such that the groove 31 is located on the inner side. In this manner, when the guide feed 21 is pressed against the screw gear 14, the pressing force produces deformation such that the bending member is opened up. The pressing force acts such that the outer side of each of the two gears 23 come into contact with the groove of the screw gear 14 as illustrated in FIG. 6B.

By structuring the guide feed 21 as described above, the two gears 23 are acted upon by an approximately equal pressing force, so that even when hard acceleration/deceleration acts while the optical pickup 7 travels, a failure such as tooth jumping, step-out or the like does not occur, resulting in achievement of stable traveling. In consequence, the present invention can provide an optical disc drive 1 with reliable recording/reproducing performance.

In other words, since the guide feed 21 has a spring property imparted by initial bending along the groove 31 serving as a boundary which is located on the opposite side of the gears 23 from the screw gear 14, the two gears 23 are supported outward on their traveling-direction sides at all times in contact with the groove of the screw gear 14.

As described above, the present invention provides an optical disc drive capable of preventing a failure such as tooth jumping, step-out or the like to occur in a traveling-system gear unit even when an optical pickup suddenly accelerates/decelerates in the radial direction of a disc in random access operation or the like in the recording/reproducing process in order to achieve stable traveling and improve reliability of recording/reproducing performance and the like.

It should be understood by those skilled in the art that various modifications, combinations, sub-combinations and alterations may occur depending on design requirements and other factors insofar as they are within the scope of the appended claims of the equivalents thereof.

What is claimed is:

1. A disc drive, comprising:
a spindle motor constructed to rotate an optical disc;
an optical pickup constructed to read from and write to a rotating optical disc;
a guide feed mounted to the optical pickup;
a plurality of gears attached to the guide feed; and
a screw gear having a helical groove engaged with the plurality of gears for traveling of the optical pickup;
wherein the guide feed includes a portion thereof that is in a bent state when not disposed to press the plurality of gears against the helical groove of the screw gear;
wherein the guide feed has an elasticity resulting in a straightening of the bent portion of the guide feed, when the guide feed is disposed to press the plurality of gears against the helical groove of the screw gear, and thereby disposing the plurality of gears to hold the helical groove of the screw gear.

2. A disc drive according to claim 1,
wherein the plurality of gears consists of two gears.

3. A disc drive according to claim 1,
wherein the guide feed is constructed to straighten such that the plurality of gears are parallel with one another.

4. A disc drive, comprising:
a spindle motor constructed to rotate an optical disc;
an optical pickup constructed to read from and write to a rotating optical disc;
a guide feed mounted to the optical pickup;
a plurality of gears attached to the guide feed; and
a screw gear having a helical groove engaged with the plurality of gears for traveling of the optical pickup;
wherein the guide feed includes a portion thereof that is in a bent state when not disposed to press the plurality of gears against the helical groove of the screw gear;
wherein the guide feed has an elasticity resulting in a straightening of the bent portion of the guide feed, when the guide feed is disposed to press the plurality of gears against the helical groove of the screw gear, thereby opening up the plurality of gears towards the helical groove of the screw gear.

5. A disc drive according to claim 4,
wherein the plurality of gears consists of two gears.

6. A disc drive according to claim 4,
wherein the guide feed is constructed to straighten such that the plurality of gears are parallel with one another.

7. A disc drive, comprising:
a spindle motor constructed to rotate an optical disc;
an optical pickup constructed to read from and write to a rotating optical disc;
a guide feed mounted to the optical pickup;
a plurality of gears attached to the guide feed; and
a screw gear having a helical groove engaged with the plurality of gears for traveling of the optical pickup;
wherein the guide feed includes a portion thereof that is in a bent state when not disposed to press the plurality of gears against the helical groove of the screw gear;
wherein the guide feed has an elasticity resulting in a straightening of the bent portion of the guide feed, when the guide feed is disposed to press the plurality of gears against the helical groove of the screw gear; and
wherein when the guide feed is disposed to press against a lead screw, an inward bending force acts on the plurality of gears, such that each of the plurality of gears conveys a pressing force on the screw gear approximately equal to the pressing force conveyed by another of the plurality of gears.

8. A disc drive according to claim 7,
wherein the plurality of gears consists of two gears.

9. A disc drive according to claim 7,
wherein the guide feed is constructed to straighten such that the plurality of gears are parallel with one another.

10. A disc drive, comprising:
a spindle motor constructed to rotate an optical disc;
an optical pickup constructed to read from and write to a rotating optical disc;
a guide feed mounted to the optical pickup;
a plurality of gears attached to the guide feed; and
a screw gear having a helical groove engaged with the plurality of gears for traveling of the optical pickup;
wherein the guide feed includes a portion thereof that is in a bent state when not disposed to press the plurality of gears against the helical groove of the screw gear;
wherein the guide feed has an elasticity resulting in a straightening of the bent portion of the guide feed, when the guide feed is disposed to press the plurality of gears against the helical groove of the screw gear; and
wherein when the guide feed is disposed to press against a lead screw, an outward bending force acts on the plurality of gears, such that each of the plurality of gears conveys a pressing force to act on the screw gear approximately equal to the pressing force conveyed by another of the plurality of gears.

11. A disc drive according to claim 10,
wherein the plurality of gears consists of two gears.

12. A disc drive according to claim 10,
wherein the guide feed is constructed to straighten such that the plurality of gears are parallel with one another.

13. A disc drive, comprising:
a spindle motor constructed to rotate an optical disc;
an optical pickup constructed to read from and write to a rotating optical disc;
a guide feed mounted to the optical pickup;
a plurality of gears attached to the guide feed; and a screw gear having a helical groove engaged with the plurality of gears for traveling of the optical pickup;

wherein the guide feed includes a portion thereof that is in a bent state when not disposed to press the plurality of gears against the helical groove of the screw gear;

wherein the guide feed has an elasticity resulting in a straightening of the bent portion of the guide feed, when the guide feed is disposed to press the plurality of gears against the helical groove of the screw gear;

wherein the guide feed has a groove formed between the plurality of gears, the groove being disposed between gears, in a face of the guide feed facing towards the screw gear, or in a face of the guide feed facing away from the screw gear;

wherein the plurality of gears are disposed to convey a uniform pressing force on the helical groove of the screw gear.

14. A disc drive according to claim 13,
wherein the plurality of gears consists of two gears.

15. A disc drive according to claim 13,
wherein the guide feed is constructed to straighten such that the plurality of gears are parallel with one another.

\* \* \* \* \*